(12) United States Patent
Sweet et al.

(10) Patent No.: US 8,891,115 B2
(45) Date of Patent: Nov. 18, 2014

(54) CONFIGURATION OF PRINT DATA FOR PRINT JOBS BASED ON DOCUMENT-PROCESSING CAPABILITIES OF PRINTERS

(75) Inventors: Michael R. Sweet, Morgan Hill, CA (US); Howard A. Miller, Saratoga, CA (US); Richard Blanchard, Jr., Sonoma, CA (US); David Gelphman, Aptos, CA (US)

(73) Assignee: Apple Inc., Cupertino, CA (US)

( * ) Notice: Subject to any disclaimer, the term of this patent is extended or adjusted under 35 U.S.C. 154(b) by 3 days.

(21) Appl. No.: 13/366,151

(22) Filed: Feb. 3, 2012

(65) Prior Publication Data

US 2013/0201494 A1    Aug. 8, 2013

(51) Int. Cl.
    *H04N 1/40*    (2006.01)
(52) U.S. Cl.
    USPC .......................... 358/1.15; 358/1.18; 358/468
(58) Field of Classification Search
    USPC ......... 358/1.15–1.18, 1.9, 2.1, 468, 523–524, 358/530, 537, 400, 406, 500, 504; 382/180, 382/306–307, 317
    See application file for complete search history.

(56) References Cited

U.S. PATENT DOCUMENTS

| | | | | |
|---|---|---|---|---|
| 5,287,194 | A * | 2/1994 | Lobiondo | ...................... 358/296 |
| 5,768,483 | A   | 6/1998 | Maniwa | |
| 6,268,927 | B1  | 7/2001 | Lo | |
| 6,549,654 | B1 * | 4/2003 | Kumada | ........................ 382/162 |
| 2002/0078149 | A1 | 6/2002 | Chang | |
| 2002/0138564 | A1 | 9/2002 | Treptow | |
| 2003/0063309 | A1 | 4/2003 | Parry | |
| 2004/0239986 | A1 | 12/2004 | Wise | |
| 2005/0046886 | A1 | 3/2005 | Ferlitsch | |
| 2005/0050013 | A1 | 3/2005 | Ferlitsch | |
| 2007/0127063 | A1 | 6/2007 | Fertlitsch | |
| 2007/0177192 | A1 | 8/2007 | Wang | |
| 2007/0182993 | A1 | 8/2007 | Yamada | |
| 2008/0112013 | A1 | 5/2008 | Ferlitsch | |

(Continued)

FOREIGN PATENT DOCUMENTS

| | | |
|---|---|---|
| CN | 1217503 A | 5/1999 |
| CN | 1525305 A | 9/2004 |

(Continued)

OTHER PUBLICATIONS

International Search Report and Written Opinion received in corresponding PCT Application No. PCT/US2013/024006 dated Apr. 25, 2013.

(Continued)

*Primary Examiner* — Thomas D Lee
*Assistant Examiner* — Stephen M Brinich
(74) *Attorney, Agent, or Firm* — Wong, Cabello, Lutsch, Rutherford & Brucculeri LLP

(57) ABSTRACT

The disclosed embodiments provide a system that facilitates the execution of a print job. During operation, the system obtains a set of document-processing capabilities from a printer associated with the print job and obtains print data for the print job. Next, the system selects a set of document attributes for the print job based on the document-processing capabilities and the print data, wherein the set of document attributes comprises a document format and a document size. Finally, the system configures the print data to conform to the document attributes to enable processing of the print job by the printer.

18 Claims, 4 Drawing Sheets

(56) References Cited

U.S. PATENT DOCUMENTS

| | | |
|---|---|---|
| 2008/0180699 A1 | 7/2008 | Selvaraj |
| 2009/0059272 A1 | 3/2009 | Matsushita |
| 2010/0178067 A1 | 7/2010 | Azami |
| 2011/0194123 A1 | 8/2011 | Sweet |
| 2011/0194124 A1 | 8/2011 | Sweet |
| 2011/0194140 A1 | 8/2011 | Sweet |
| 2011/0194141 A1 | 8/2011 | Sweet |
| 2011/0235064 A1 | 9/2011 | Arai |

FOREIGN PATENT DOCUMENTS

| | | | |
|---|---|---|---|
| CN | 1537298 A | | 10/2004 |
| EP | 1450515 A2 | | 8/2004 |
| EP | 1818805 A2 | | 8/2007 |
| EP | 1953642 A2 | | 8/2008 |
| EP | 1973031 A1 | | 9/2008 |
| JP | 11053142 A | * | 2/1999 |
| WO | 2011100148 A1 | | 8/2011 |

OTHER PUBLICATIONS

First Office Action received in corresponding CN Application No. 201110034714.0, dated May 24, 2013.
Search Report and Written Opinion received in corresponding PCT Application No. PCT/US2011/023475, dated Mar. 25, 2011.
First Office Action received in corresponding CN Application No. 201110034596.3 dated Apr. 2, 2013 with translation.
Office Action received in corresponding U.S. Appl. No. 12/882,107, dated Apr. 26, 2013.
International Search Report and Written Opinion for PCT Application No. PCT/US2011/023474, Dated Mar. 25, 2011, 7 pages.
Cheshire S. et al., "DNS_Based Service Discovery," The Internet Society, Feb. 14, 2004, 32 pages.
Cheshire, S. et al., "Dynamic Configuration of IPv4 Link-Local Addresses," The Internet Society, May 2005, 33 pages.
Wright, F.D., "Design Goals for an Internet Protocol," The Internet Society, Apr. 1999, 86 pages.
"Bonjour Printing Specification," Apple Computer, Inc., Apr. 12, 2005, 24 pages.
Zilles, Stephen, "Rationale for the Structure of the Model and Protocol for the Internet Printing Protocol," The Internet Society, Apr. 1999, 10 pages.
Hastings, T. et al., "Internet Printing Protocol/1.0: Implementer's Guide," The Internet Society, Jul. 1999, 65 pages.
Office Action received in corresponding U.S. Appl. No. 12/882,134 dated May 2, 2013.
International Search Report and Written Opinion received in corresponding PCT Application No. PCT/US2013/024031 dated Apr. 17, 2013.

* cited by examiner

CONFIGURATION OF PRINT DATA FOR PRINT JOBS BASED ON DOCUMENT-PROCESSING CAPABILITIES OF PRINTERS

RELATED APPLICATION

The subject matter of this application is related to the subject matter in a co-pending non-provisional application by inventors Michael R. Sweet and Howard Miller and filed 14 Sep. 2010, entitled "Framework that Supports Driverless Printing," having Ser. No. 12/882,116.

BACKGROUND

1. Field

The disclosed embodiments relate to printers for computer systems. More specifically, the disclosed embodiments relate to techniques for configuring print data for print jobs based on the document-processing capabilities of printers used to execute the print jobs.

2. Related Art

Printing may facilitate a variety of personal and/or business activities. For example, documents may be printed within a business for design, marketing, accounting, review, record-keeping, planning, and/or notification purposes. Similarly, a user may print pictures and/or greeting cards for display and/or sharing with friends, family, and/or acquaintances.

However, different types of print settings and/or printer capabilities may be required to produce optimal print output for various types of documents. For example, a Portable Document Format (PDF) file may be associated with the highest fidelity and/or quality of print output. However, PDF files may not be compatible with printers that do not support PDF printing. Moreover, printers that support PDF printing may be unable to process large PDF files that exceed the memory limits of the printers and/or PDF files with font formats, encryption, compression formats, bit depths, transparency, and/or color spaces that are not supported by the printers. In other words, the printing of documents may be limited by a printer's document-processing capabilities with respect to different document sizes, document formats, and/or extensions to the document formats.

Hence, what is needed is a mechanism for facilitating the printing of documents associated with various document sizes, document formats, and/or document format extensions on printers with different document-processing capabilities.

SUMMARY

The disclosed embodiments provide a system that facilitates the execution of a print job. During operation, the system obtains a set of document-processing capabilities from a printer associated with the print job and obtains print data for the print job. Next, the system selects a set of document attributes for the print job based on the document-processing capabilities and the print data, wherein the set of document attributes includes a document format and a document size. Finally, the system configures the print data to conform to the document attributes to enable processing of the print job by the printer.

In some embodiments, the system also obtains a set of job options for the print job, and further selects the set of document attributes for the print job based on the job options.

In some embodiments, the set of job options includes at least one of a media size, a media type, a print quality, a number of printing sides, a number of copies, and an ink set.

In some embodiments, configuring the print data to conform to the document attributes involves at least one of converting the print data into the document format, and dividing the print data into a set of smaller files based on the document size to enable individual processing of each of the smaller files by the printer.

In some embodiments, converting the print data to the document format involves converting the print data into a raster format. For example, the print data may be converted into the raster format to remove memory limitations and/or features that are incompatible with the printer from the print data.

In some embodiments, the document format is at least one of a Portable Document Format (PDF), a Joint Photographic Experts Group (JPEG) format, and a raster format.

In some embodiments, the set of document-processing capabilities comprises at least one of a memory limit, a maximum dimension, a compression format, a bit depth, an encryption capability, a font-management capability, a color-management capability, and a transparency-support capability.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
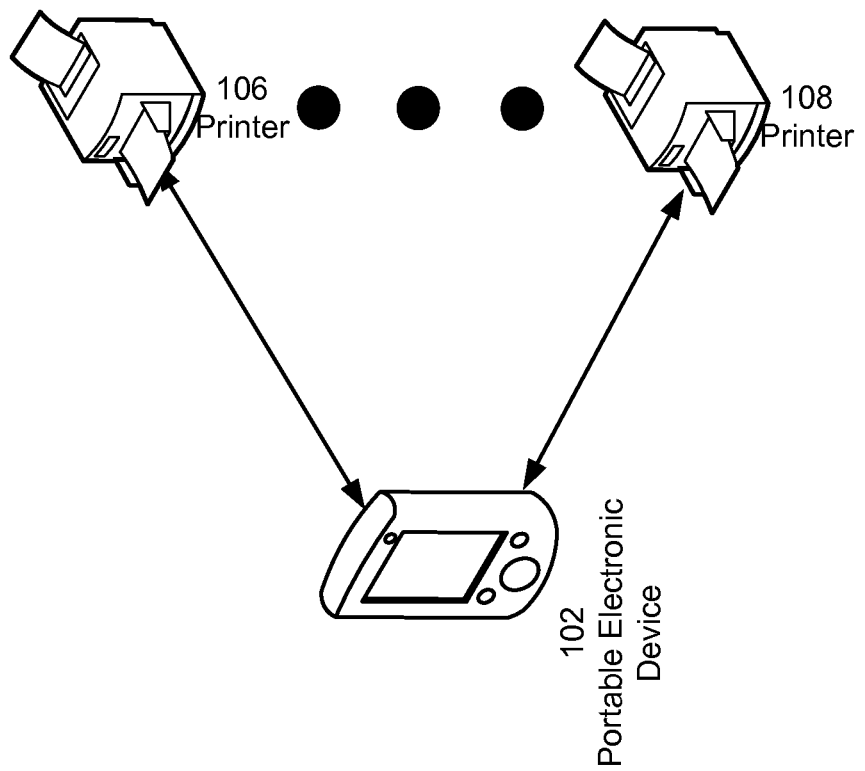
FIG. 1 shows a printing system in accordance with the disclosed embodiments.

The disclosed embodiments facilitate the execution of print jobs. As shown in FIG. 1, a portable electronic device 102 includes functionality to communicate with a set of printers 106-108. For example, portable electronic device 102 may implement a print server that configures print jobs from portable electronic device 102, sends the print jobs to printers 106-108, and receives notifications associated with the print jobs from printers 106-108. Alternatively, portable electronic device 102 may communicate with printers 106-108 through an external print server.

Portable electronic device 102 may correspond to a mobile phone, laptop computer, tablet computer, personal digital assistant (PDA), portable media player, and/or other type of battery-powered electronic device. Printers 106-108 may correspond to network printers that are capable of wired and/or wireless communications. Alternatively, one or more printers may connect to portable electronic device 102 and/or another print server as local peripherals using one or more printer cables and/or one or more ports (e.g., parallel ports, serial ports, Universal Serial Bus (USB) ports).

Portable electronic device 102 may interact with printers 106-108 through one or more networks. Such networks may include any type of communication channel capable of coupling together network nodes. For example, the network(s) may include a wireless network connection, such as a Bluetooth (Bluetooth™ is a registered trademark of Bluetooth SIG, Inc.) network connection; a cellular networking connection (e.g., a 3G/4G network or an Edge network); a networking connection based on the standards described in Institute for Electrical and Electronic Engineers (IEEE) 802.11; a wireless personal-area networking (PAN) connection, such as a network connection based on the standards described in IEEE 802.15; or any peer-to-peer (wireless or wired) networking technology.

In one or more embodiments, the printing system of FIG. 1 includes functionality to perform "driverless printing," in which a user of portable electronic device 102 may print to a nearby printer (e.g., printers 106-108) without installing and/or updating associated printer driver software. For example, portable electronic device 102 may discover (e.g., detect) a nearby printer (e.g., printers 106-108) using a discovery protocol such as Bonjour (Bonjour™ is a registered trademark of Apple Inc.). To enable detection of the printer by portable electronic device 102, the printer may advertise a driverless-printing service on the discovery protocol. For example, the printer may advertise the driverless-printing service on Bonjour by publishing a specific service type and subtype.

Figure 2:
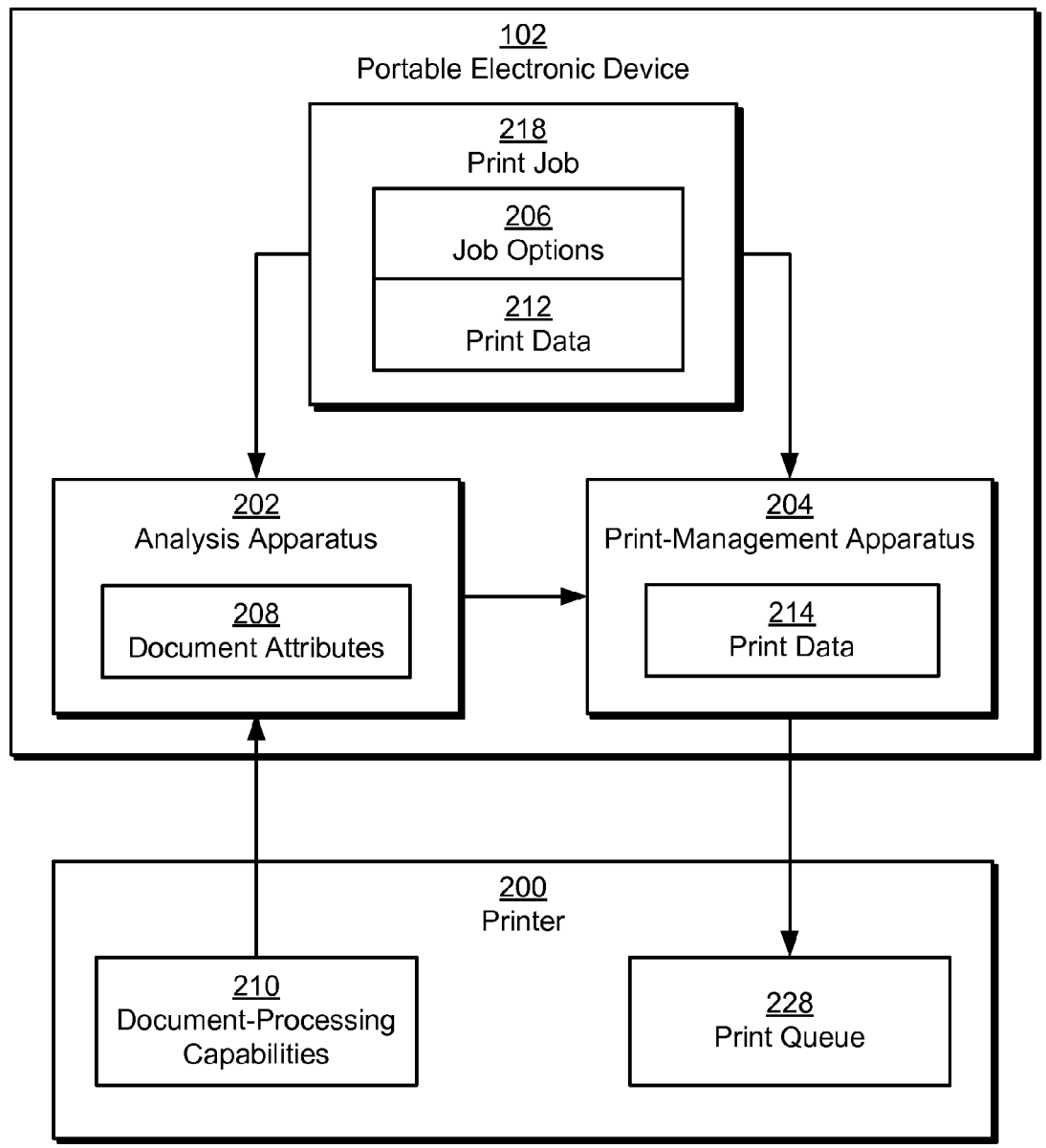
FIG. 2 shows a system for facilitating the execution of a print job in accordance with the disclosed embodiments.

As shown in FIG. 2, once a printer 200 is selected for performing a print job 218 (e.g., by a user of portable electronic device 102), a print-management apparatus 204 on portable electronic device 102 may obtain print job 218 from an application on portable electronic device 102 and transmit print job 218 to printer 200 over a network connection with printer 200. Printer 200 may then place print job 218 into a print queue 228 and execute print job 218 after print jobs preceding print job 218 in print queue 228 have been completed and/or cancelled. Driverless printing for portable electronic devices is discussed in further detail in a co-pending non-provisional application by inventors Michael R. Sweet and Howard Miller and filed 14 Sep. 2010, entitled "Framework that Supports Driverless Printing," having Ser. No. 12/882,116, which is incorporated herein by reference.

Those skilled in the art will appreciate that printer 200 may support a number of document formats to enable processing of print jobs (e.g., print job 218) from different applications and/or print servers. For example, printer 200 may support printing of Portable Document Format (PDF) documents, Joint Photographic Experts Group (JPEG) documents, PostScript (PostScript™ is a registered trademark of Adobe Inc.) documents, and/or raster format documents. In addition, printer 200 may provide a set of document-processing capabilities 210 for each document format supported by printer 200. For example, printer 200 may specify a memory limit, maximum dimensions (e.g., for an image), a compression format, a bit depth, an encryption capability, a font-management capability, a color-management capability, and/or a transparency-support capability for the PDF, JPEG, and/or PostScript document formats.

Conversely, portable electronic device 102 and/or printer 200 may be unable to process print data (e.g., print data 212) associated with document formats and/or document attributes 208 that are not supported by printer 200 and/or a printing protocol (e.g., driverless-printing service) used to perform print jobs (e.g., print job 218). For example, printer 200 may be unable to process a PDF file if printer 200 does not support PDF printing; the size of the PDF file exceeds the memory limit of printer 200; and/or the PDF file contains a color space, compression format, encryption, transparency, and/or high bit depth not included in document-processing capabilities 210 of printer 200.

In one or more embodiments, the system of FIG. 2 includes functionality to facilitate the execution of print job 218 on printer 200 by configuring print job 218 based on document-processing capabilities 210. First, an analysis apparatus 202 in portable electronic device 102 may obtain document-processing capabilities 210 from printer 200. For example, analysis apparatus 202 may use Internet Printing Protocol (IPP) and/or a driverless-printing service to query printer 200 for a memory limit, maximum dimensions, compression format, bit depth, encryption capability, font-management capability, color-management capability, and/or transparency-support capability for the document format (e.g., PDF, JPEG) associated with print data 212 for print job 218.

Next, analysis apparatus 202 may obtain a set of job options 206 for print job 218. Job options 206 may correspond to settings provided by a user requesting print job 218. For example, job options 206 may include a number of copies, a number of printing sides (e.g., single- or double-sided), collation, stapling, hole punching, an ink set (e.g., black-and-white, color), a media size (e.g., A4, letter), a border size (e.g., bordered, borderless), a toner, a dye, a ribbon, a media type (e.g., glossy, matte, bond, colored), a resolution and/or print quality (e.g., low, medium, high), a page orientation, and/or a printing range (e.g., page range, selection).

After document-processing capabilities 210 and/or job options 206 are obtained, analysis apparatus 202 may select a set of document attributes 208 for print job 218 based on document-processing capabilities 210, print data 212, and/or job options 206. Print-management apparatus 204 may then configure print data 212 to conform to document attributes 208 to enable processing of print job 218 by printer 200.

More specifically, analysis apparatus 202 may compare print data 212 with document-processing capabilities 210 to determine if print data 212 matches document-processing capabilities 210. If print data 212 matches document-processing capabilities 210, analysis apparatus 202 may set document attributes 208 to those found in print data 212 and/or otherwise specify that print data 212 contains a set of document attributes 208 that are compatible with document-processing capabilities 210. Print-management apparatus 204 may then send print job 218 to printer 200 without modifying print data 212 and/or job options 206.

On the other hand, if print data 212 does not match document-processing capabilities 210, analysis apparatus 202 may specify document attributes 208 that match both document-processing capabilities 210 and job options 206, and print-management apparatus 204 may convert print data 212 into print data 214 that conforms to document attributes 208. For example, print data 212 may correspond to a large PDF document that exceeds the memory limit of printer 200, thus precluding processing of print job 218 by printer 200. If a high print quality is specified in job options 206, analysis apparatus 202 may set document attributes 208 to indicate that print data 212 should be divided into a set of smaller files, each containing a subset of the pages in the PDF document. Print-management apparatus 204 may then divide print data 212 into the smaller files and send a series of print jobs, each of which contains one of the smaller files, to printer 200, thus enabling individual processing of each of the smaller files by printer 200 and the generation of print output that matches the original PDF document. Conversely, if a low or medium print quality is specified in job options 206, analysis apparatus 202 may specify a lower-quality raster format for print data 212 in document attributes 208, and print-management apparatus 204 may convert the large PDF document into rasterized print data 214 that fits in the memory of printer 200.

Such reformatting of print data (e.g., print data 212) for print jobs (e.g., print job 218) based on document-processing capabilities (e.g., document-processing capabilities 210) of printers (e.g., printer 200) associated with the print jobs may enable the printing of documents associated with various document sizes, document formats, and/or document format extensions on the printers. Moreover, additional configuring of the print data based on job options associated with the print jobs may ensure that print output produced from the print jobs is in line with user intent for the print jobs.

Figure 3:
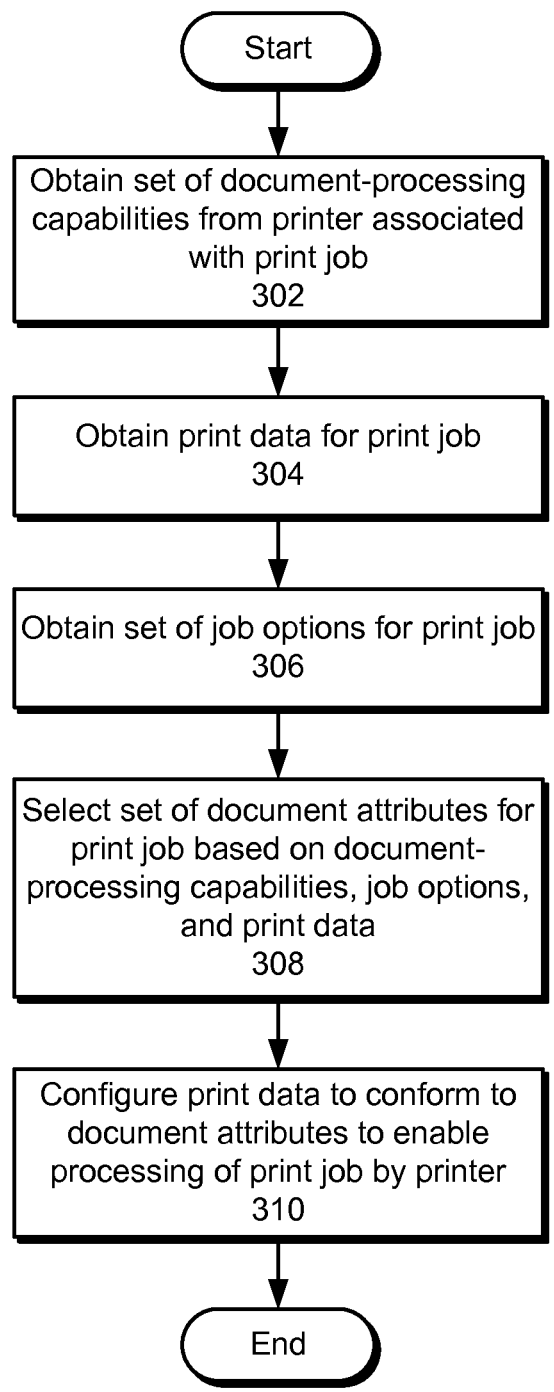
FIG. 3 shows a flowchart illustrating the process of facilitating the execution of a print job in accordance with the disclosed embodiments.

FIG. 3 shows a flowchart illustrating the process of facilitating the execution of a print job in accordance with the disclosed embodiments. In one or more embodiments, one or more of the steps may be omitted, repeated, and/or performed in a different order. Accordingly, the specific arrangement of steps shown in FIG. 3 should not be construed as limiting the scope of the technique.

Initially, a set of document-processing capabilities is obtained from a printer associated with the print job (operation 302). The document-processing capabilities may include a memory limit, a maximum dimension, a compression format, a bit depth, an encryption capability, a font-management capability, a color-management capability, and/or a transparency-support capability for one or more document formats (e.g., PDF, JPEG) supported by the printer.

Print data and/or a set of job options for the print job are also obtained (operations 304-306). The print data may correspond to a document associated with the document format. The job options may specify a media size, a media type, a print quality, a number of printing sides, a number of copies, and/or an ink set for the print job.

Next, a set of document attributes for the print job is selected based on the document-processing capabilities, job options, and/or print data (operation 308). The document attributes may include a document format and a document size. For example, the document attributes may specify a raster format for the print data if the print data contains encryption, font formats, compression, bit depth, and/or color spaces that are not supported by the printer. If the print data exceeds the printer's memory limit and the job options specify a low or medium print quality, the document attributes may specify a smaller document size than that of the print data and/or a lower-quality document format (e.g., a raster format). Finally, if the print data exceeds the printer's memory limit and the job options specify a high print quality, the document attributes may specify the splitting of the print data into smaller files to enable individual processing of the smaller files by the printer.

The print data is then configured to conform to the document attributes to enable processing of the print job by the printer (operation 310). For example, unmodified print data may be transmitted to the printer if the print data already conforms to the document attributes. If the print data requires modification to conform to the document attributes, the print data may be scaled down and/or converted into a raster format to remove memory limitations associated with processing non-raster print data and/or features that are incompatible with the printer from the print data. Alternatively, the print data may be divided into a set of smaller files, and a new print job may be created for each of the smaller files to enable sequential processing of the print data by the printer without exceeding the memory limit of the printer.

Figure 4:
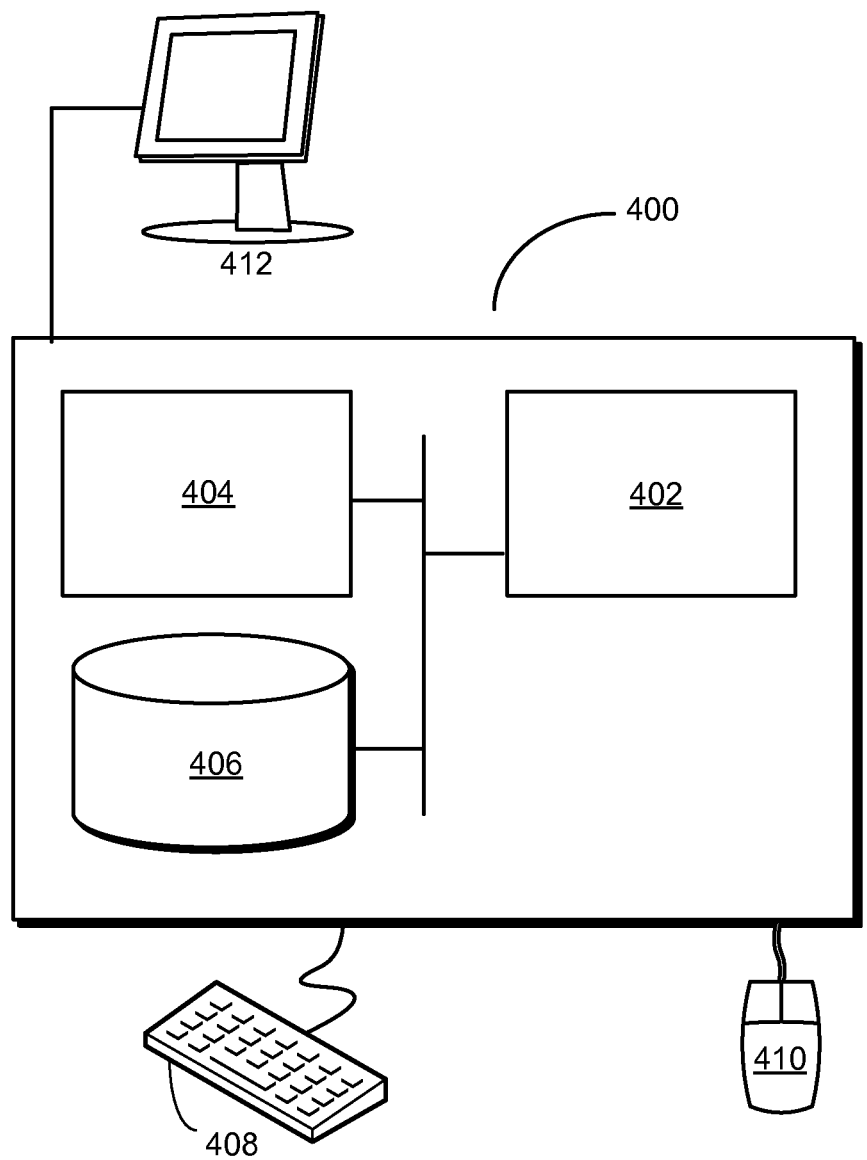
FIG. 4 shows a computer system in accordance with the disclosed embodiments.

FIG. 4 shows a computer system 400 in accordance with the disclosed embodiments. Computer system 400 may correspond to an apparatus that includes a processor 402, memory 404, storage 406, and/or other components found in electronic computing devices. Processor 402 may support parallel processing and/or multi-threaded operation with other processors in computer system 400. Computer system 400 may also include input/output (I/O) devices such as a keyboard 408, a mouse 410, and a display 412.

Computer system 400 may include functionality to execute various components of the present embodiments. In particular, computer system 400 may include an operating system (not shown) that coordinates the use of hardware and software resources on computer system 400, as well as one or more applications that perform specialized tasks for the user. To perform tasks for the user, applications may obtain the use of hardware resources on computer system 400 from the operating system, as well as interact with the user through a hardware and/or software framework provided by the operating system.

In one or more embodiments, computer system 400 provides a system for facilitating the execution of a print job. The system may include an analysis apparatus that obtains a set of document-processing capabilities from a printer associated with the print job and obtains print data for the print job. The analysis apparatus may also select a set of document attributes for the print job (e.g., document format, document size, bit depth, color space, encryption, compression format, font, transparency, etc.) based on the document-processing capabilities and the print data. The system may also include a print-management apparatus that configures the print data to conform to the document attributes to enable processing of the print job by the printer. For example, the print-management apparatus may convert the print data into a different document format and/or divide the print data into a set of smaller files based on the selected document size to remove memory limitations and/or features that are incompatible with the printer from the print data.

In addition, one or more components of computer system 400 may be remotely located and connected to the other components over a network. Portions of the present embodiments (e.g., analysis apparatus, print-management apparatus, portable electronic device, printer, etc.) may also be located on different nodes of a distributed system that implements the embodiments. For example, the present embodiments may be implemented using a number of portable electronic devices and a number of printers configured to perform printing for the portable electronic devices using a driverless-printing service.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method for facilitating the execution of a print job, comprising:
   receiving, from an application executing on a portable electronic device, a print job;
   obtaining, by the portable electronic device, a set of document-processing capabilities from a printer coupled to the portable electronic device by a wireless network;
   obtaining, by the portable electronic device, print data for the print job from the application;
   selecting, by the portable electronic device, a set of document attributes for the print job based on the document-processing capabilities and the print data;
   determining the print data does not conform to the selected document attributes; and
   modifying, by the portable electronic device, at least some of the print data to conform the print data to the selected document attributes to enable processing of the print job by the printer, wherein modifying includes one or more of scaling down the document size, and converting print data for a document that has a first format to a second format compatible with the selected printer.

2. The computer-implemented method of claim 1, further comprising:
   obtaining, by the portable electronic device, a set of job options for the print job; and
   further selecting, by the portable electronic device, the set of document attributes for the print job based on the job options.

3. The computer-implemented method of claim 2, wherein the set of job options comprises at least one of:
   a media size;
   a media type;
   a print quality;
   a number of printing sides;
   a number of copies; and
   an ink set.

4. The computer-implemented method of claim 1, wherein modifying the print data to conform the print data to the document attributes involves converting the print data into a raster format.

5. The computer-implemented method of claim 1, wherein the second format is at least one of a Portable Document Format (PDF), a Joint Photographic Experts Group (JPEG) format, and a raster format.

6. The computer-implemented method of claim 1, wherein the set of document-processing capabilities comprises at least one of:
   a memory limit;
   a maximum dimension;
   a compression format;
   a bit depth;
   an encryption capability;
   a font-management capability;
   a color-management capability; and
   a transparency-support capability.

7. A system for facilitating the execution of a print job, comprising:
   an analysis apparatus configured to:
      receive, from an application executing on a portable electronic device, the print job;
      obtain a set of document-processing capabilities from a printer coupled to the portable electronic device by a wireless network;
      obtain print data for the print job from the application;
      select a set of document attributes for the print job based on the document-processing capabilities and the print data; and
      determine the print data does not conform to the selected document attributes; and
   a print-management apparatus configured to modify at least some of the print data to conform the print data to the selected document attributes to enable processing of the print job by the printer, wherein modifying includes one or more of scaling down the document size, and converting print data for a document that has a first format to a second format compatible with the selected printer.

8. The system of claim 7, wherein the analysis apparatus is further configured to:
   obtain a set of job options for the print job; and
   further select the set of document attributes for the print job based on the job options.

9. The system of claim 8, wherein the set of job options comprises at least one of:
   a media size;
   a media type;
   a print quality;
   a number of printing sides;
   a number of copies; and
   an ink set.

10. The system of claim 7, wherein the print-management apparatus' configuration to modify at least some of the print data to the second format involves converting the print data into a raster format.

11. The system of claim 7, wherein the second format is at least one of a Portable Document Format (PDF), a Joint Photographic Experts Group (JPEG) format, and a raster format.

12. The system of claim 7, wherein the set of document-processing capabilities comprises at least one of:
   a memory limit;
   a maximum dimension;
   a compression format;
   a bit depth;
   an encryption capability;
   a font-management capability;
   a color-management capability; and
   a transparency-support capability.

13. A non-transitory computer-readable storage medium storing instructions that when executed by a computer cause the computer to:
   receive, from an application executing on a portable electronic device, a print job;
   obtain a set of document-processing capabilities from a printer coupled to the portable electronic device by a wireless network;
   obtain print data for the print job from the application;

select a set of document attributes for the print job based on the document-processing capabilities and the print data;

determine the print data does not conform to the selected document attributes; and modify at least some of the print data to conform the print data to the selected document attributes to enable processing of the print job by the printer, wherein the instructions to modify include instructions to perform one or more of scaling down a document size of the document, and converting print data for a document that has a first format to a second format compatible with the selected printer.

14. The computer-readable storage medium of claim 13, the instructions further comprising instructions to:

obtain a set of job options for the print job; and further select the set of document attributes for the print job based on the job options.

15. The computer-readable storage medium of claim 14, wherein the set of job options comprises at least one of:

a media size;
a media type;
a print quality;
a number of printing sides;
a number of copies; and
an ink set.

16. The computer-readable storage medium of claim 13, wherein the instructions to modify the print data to the document format include instructions to convert the print data into a raster format.

17. The computer-readable storage medium of claim 13, wherein the document format is at least one of a Portable Document Format (PDF), a Joint Photographic Experts Group (JPEG) format, and a raster format.

18. The computer-readable storage medium of claim 13, wherein the set of document-processing capabilities comprises at least one of:

a memory limit;
a maximum dimension;
a compression format;
a bit depth;
an encryption capability;
a font-management capability;
a color-management capability; and
a transparency-support capability.

\* \* \* \* \*